Oct. 2, 1934.  R. J. ANDERSON  1,975,528
REGULATOR FOR MOLDING MACHINES
Filed April 14, 1932  2 Sheets-Sheet 1
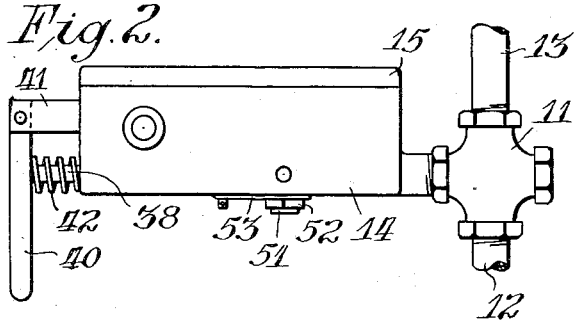
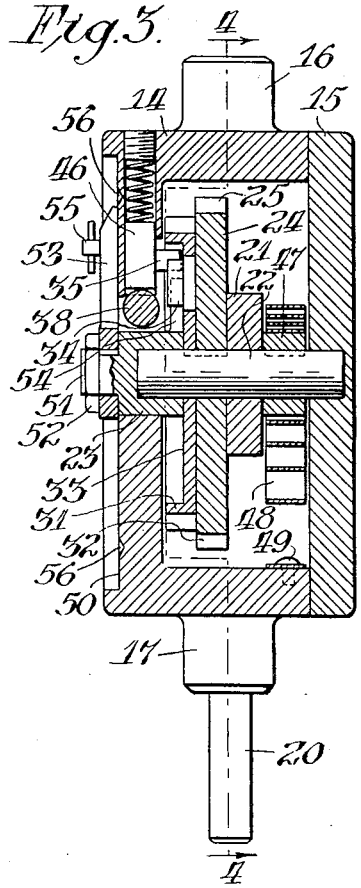
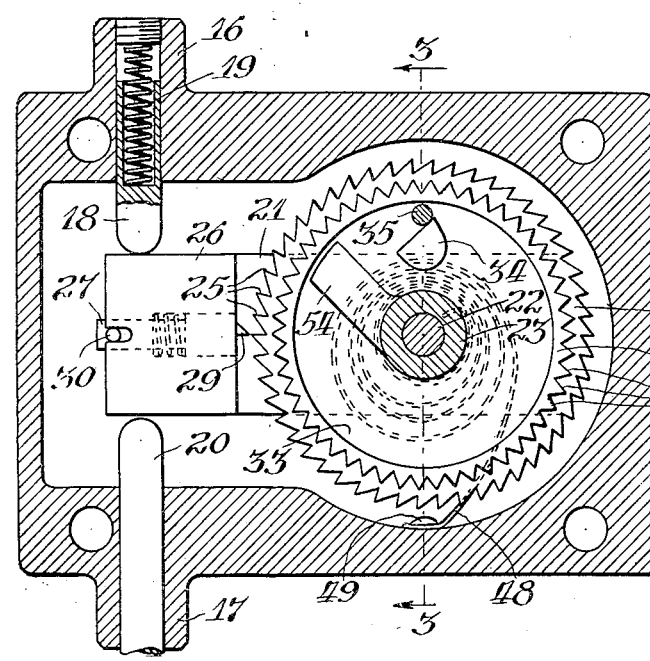
Inventor
Russell J. Anderson,
By Paul O. Pippel
Atty.

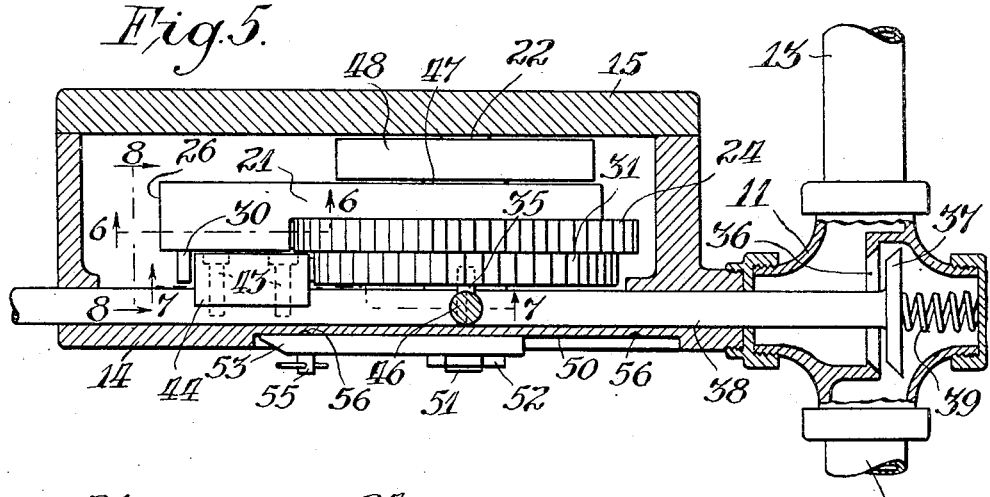

Patented Oct. 2, 1934

1,975,528

UNITED STATES PATENT OFFICE

1,975,528

REGULATOR FOR MOLDING MACHINES

Russell J. Anderson, Racine, Wis., assignor to Belle City Malleable Iron Company, Racine, Wis., a corporation of Wisconsin Application April 14, 1932, Serial No. 605,165

12 Claims. (Cl. 192—139)

This invention relates to a regulator for jarring machines commonly employed in foundries for packing sand in a molding flask.

These jarring machines, as well known in the art, embody a horizontal table actuated vertically by an air operated piston. The molding flask is placed on the table after which the operator manually opens a valve in the air line to cause the piston to raise the table with its flask. At the appropriate time the air is permitted to escape from the piston cylinder to cause the table with its load to drop by gravity against an abutment which action jars the flask to pack the sand therein around the pattern by inertia.

In practice it is found that the number of jars thus imparted to different flasks, turning out molds for the same piece of work, varies and as a result the density of packing of the sand also varies causing an objectionable lack of uniformity in the castings formed therefrom. Of course, this arises entirely from the human element involved as the operator has to count the number of blows imparted to the flask. If he counts too few jars or blows, the sand will not be packed with sufficient density to form a good casting, and if he carelessly permits too many blows he not only wastes air but needlessly wears the jarring machine and as a consequence retards production and adds to costs.

It is obvious then, highly desirable that some means be provided for these jarring, molding machines to regulate automatically the predetermined number of blows to be imparted to a flask.

It is among the objects of this invention therefore, to provide an improved regulator for a jarring, molding machine; to provide such a device which will be simple, effective and fool proof in operation; to provide such a device adapted for easy association with a standard molding machine without altering the construction thereof; and, lastly, generally to improve the operation of these molding machines.

Of course, other objects of the invention will be apparent to those skilled in this art as the disclosure is more fully made.

Briefly, such desirable objects may be achieved by a device suitably mounted in relation to the molding machine and connected to cut off the air that operates the piston at a predetermined time after the air has been manually turned on. Turning on the air, by which is meant opening the valve, sets the regulator in starting position and thereafter the movement of the table sets the device into operation, the same continuing until the flask has been jarred the predetermined number of times, whereupon trip mechanism acts to close the air valve to stop the machine and jarring action.

In the accompanying sheets of drawings illustrating a practicable form of the invention:

Figure 1 is a face view of the regulator device associated with the jarring table of a molding machine not shown;

Figure 2 is a top plan view of the device;

Figure 3 is a vertical, cross sectional view, through the device as seen along the line 3—3, appearing in Figure 4 when viewed in the direction of the arrows;

Figure 4 is a vertical, cross sectional view, taken along the line 4—4 appearing in Figure 3, looking in the indicated direction;

Figure 5 is a horizontal, cross sectional view, taken along the line 5—5, looking downwardly as shown in Figure 1;

Figure 6 is an enlarged, fragmentary detail view, partly in section as seen approximately along line 6—6, appearing in Figure 5 and showing the ratchet wheel;

Figure 7 is a view similar to Figure 6 as seen approximately along line 7—7 appearing in Figure 5, and showing the brake wheel;

Figure 8 is a detail, vertical sectional view of the structure viewed along line 8—8 seen in Figure 5; and Figure 9 is a general sectional view to show the manner of associating the regulator with a molding machine.

The jarring molding machine being well known in the art has only generally been shown, it being sufficient for the purposes of this disclosure to indicate the same by a table 10 shown in Figures 1 and 9, such table 10 being movable upwardly by an air operated piston 10$^a$ and when the air is suddenly released from the cylinder by the usual exhaust valve not shown, such table drops by gravity against an abutment 10$^b$ to jar the same and a flask carried thereby. The air line control valve later to be described for passing air to operate the table is enclosed in a housing 11 having a connection 12 to a source of compressed air supply not shown, and another connection 13 connected to operate the piston for the table 10.

The regulator device of this invention preferably comprises a body in the form of a rectangular box 14 closed at its rear face by a cover 15. This body 14 is suitably carried adjacent the molding machine in the manner indicated in Figure 9. Along one end the top of the box is provided with an upwardly disposed, apertured boss 16, and its bottom is provided with a downwardly extending boss 17. The upper boss 16 serves as a nest for a plunger 18 pressed by a spring 19 (see Figure 4) while the other boss 17 carries a plunger 20. The plunger 20 is adapted in any appropriate manner to be engaged by the table 10 such result being obtained by properly locating the box 14 in relation to the molding machine. These two plungers 18 and 20 are preferably in vertical alinement, as shown, and at their inner ends, within the box they are rounded and spaced apart. Between these rounded ends of said plungers is located the free end of a ratchet arm 21, which adjacent its other end is loosely or turnably mounted for pivoting movement on a cross shaft 22 journaled for turning movement in the cover 15 and a bearing block 23 turnably mounted in the front wall of the box.

Keyed to the shaft 22 adjacent the arm 21 is a ratchet wheel 24 having a predetermined number of ratchet teeth 25. The ratchet arm 21 has an L-head extension 26 formed with a bore to receive a plunger 27 pressed by a spring 28, said plunger at its end facing the wheel 24 formed with a ratchet pawl 29, adapted in the operative position of the parts to engage the teeth to turn the wheel 24 in a step by step manner. The other end of the plunger 27 is mounted in the L-head 26 by means of a cross pin 30 to prevent the plunger from turning in its bore thereby always insuring proper presentation of the pawl 29 to the teeth 25. This pin 30, however, does not prevent the plunger 27 from reciprocating in its bore which it must do at times as will later be described. This pin 30 also protrudes laterally of the extension 26 toward the front wall of the box as appears best in Figure 5 for a purpose later to appear.

Also keyed to the shaft 22 adjacent the ratchet wheel 24 is a brake wheel 31 having a number of teeth 32 equal in number to the number of ratchet teeth 25 on the wheel 24. The face of this wheel 31, facing the front wall of the box 14 is dished out or recessed as shown at 33. This recessed face of the wheel 31 carries a stud 34 having a flattened side as shown best in Figure 4, said stud as it moves in a circular path with the wheel 31, as will later appear, being in line to engage the under side of a pin 35 the purpose of which will presently be described.

Looking now to Figure 5, it will be seen that the air for operating the molding machine table passes from lead 12 to lead 13 through a valve port 36 formed in the housing 11, said port adapted to be closed by a valve 37 on a cross rod 38 slidingly mounted in the end walls of the box 14, the valve 37 and of course the stem or rod 38 being pressed by a spring 39 to keep the valve to its seat. As shown in Figures 1 and 2 this rod 38 projects out of the box 14 and engages a hand lever 40 pivotally connected to a bracket 41 carried by the box. A spring 42 encircles the rod 38 between the handle 40 and the box, said spring acting with valve spring 39 to keep the valve 37 closed.

Within the box 14 the rod 38 has fixed thereto by screws 43 a block 44 as appears in Figure 5, said block as best shown in Figure 7 being bored out to receive a spring pressed brake lock member 45 engageable between the teeth 32 of the brake wheel 31. The rod 38 further is notched to receive the lower end of a vertically disposed spring pressed detent lock pin 46, said lock pin being mounted in the top of the box 14 as shown in Figure 3. It will now be observed that pin 35 is carried by pin 46 so that if pin 35 is pushed up by stud 34 necessarily the pin 46 must also be pushed up, thus releasing the detent lock described to free the valve stem rod 38.

Between the arm 21 and cover 15 there is keyed to the shaft 22 a drum 47 to which is anchored in any suitable way one end of a spirally wound flat spring 48, the other end of said spring being anchored to the bottom of the box as for example at 49. See Figure 3.

Also shown best in Figure 3 it will be seen that the front face of the box 14 is recessed to form a circular depression 50 through the center of which protrudes the front end of the bearing block 23 finished with a threaded end 51 that receives a nut 52 to fasten a radially disposed indicator arm 53 in place, said arm being keyed to the block 23 to turn therewith as a unit. On the inside of the box the block 23 is integrally formed with a substantially radially extending stop arm 54 shown also in Figure 4. From the construction described it will be clear that when the indicator arm 53 is moved on the outside face of the box the stop arm 54 on the inside of the box must move with it as a unit. As shown in Figures 1 and 3 the outer end of the indicator arm 53 carries a set screw 55 which may be secured in any selected one of a circular series of indentations 56 formed in the face of the circular depression 50, the number of indentations preferably equaling the number of teeth on the wheels 24 and 31. The details of construction now having been completely described, an explanation of the operation will next be given.

To begin with, the box 14 will first be appropriately mounted in relation to the jarring molding machine so that the valve rod 38 and valve 37 will be in proper position relative to the inlet and outlet air leads 12 and 13. Also the plunger 20 must be in position to be engageable by the table 10 as it moves up or down.

Let us assume that it is desired to impart fifteen jolts to the flask on the table 10. Accordingly the indicator arm 53 is moved from number one indentation 56 which may be at the top of the circular series as shown in Figure 1, counterclockwise to the fifteenth indentation and there securely locked in place by the thumb screw device 55. This move has, of course, also turned the stop arm 54 inside the box to the same position, the two arms 54, 53 being locked together now. The operator now moves lever 40 towards the right as seen in Figures 1, 2 and 5 against the push of springs 39, 42 until detent 46 falls by spring pressure into the notch in the valve stem rod 38, thus positively locking the valve stem rod in a position to hold open the valve 37 and permit passage of air through lead 13 to operate the piston which raises the table 10. Shifting of the valve stem rod 38 in the manner described has also carried to the right the block 44 to engage the brake lock 45 with the teeth 32 of the brake wheel 31 and at the same time the spring 28 is now effective to push the pawl 29 into operative position relative to the ratchet teeth 25 on the ratchet wheel 24. This is so because the block 44 cannot now engage the pin 30 to hold pawl 29 out of engaging position with respect to the ratchet wheel.

The table 10 now pushes upwardly on the plunger 20 thereby raising the lever 21 and plunger 18. On the up stroke of the lever 21 the pawl 29 slides over the ratchet teeth 25 without moving the ratchet wheel. However as the table 10 drops, the plunger 18, pushed by its spring 19, now operates to move the lever 21 downwardly in which direction of movement the pawl 29 engages operatively with the ratchet teeth 25 to move or index the wheel 24 counterclockwise one notch or step. The wheel 24 is keyed to the shaft 22 it will be remembered, consequently the brake wheel, also keyed to the shaft moves one step with the ratchet wheel. The brake lock 45 merely serves to hold the wheels 24, 31 as they advance step by step to prevent back-lash as turning movement of the shaft 22 winds up the clock spring 48 to place the same under tension. This indexing operation continues once for each operation of the table 10 until fifteen steps have been imparted to the ratchet wheel. At this time the flat side of the stud 34 engages underneath the pin 35 as shown in Figure 4 raising the same to cause disengagement of the detent lock 46 from the valve stem 38. Instantly the clock spring 48 now returns the wheels 24, 31 clockwise to their initial starting position and at the same instant the springs 39, 42 return the valve stem rod 38 to the left to close the valve 37 to stop the passage of air and operation of the jarring machine. As the rod 38 moves to the left, the block 44 carried thereby engages the pin 30 to release the pawl 29 from the ratchet wheel 24. The lug 34 being fixedly carried on the brake wheel 31, of course, must turn back clockwise with the wheel under the driving action of the spring 48 until it strikes against the fixed stop arm 54, whereupon the wheels 24, 31 once more are in the initial set position. As a consequence of this operation it must now be clear that the flask on the table 10 has been jarred fifteen times as desired. The operator now removes the properly rammed flask from the table 10 and replaces it with another to be rammed. Upon setting the handle 40 in the manner described the molding machine once more operates, and the new flask is jarred fifteen times, after which the machine automatically is stopped. Obviously, any number of jars may be had by appropriately setting the indicator and stop arms with respect to the indentations 56, the number of jars permitted, of course, being limited by the number of teeth on the wheels 31 and 24. For practicable purposes then, the molding machine may be regulated for any desired number of jars or blows.

In mounting the jar regulator in practice in relation to the jarring machine table, it may be desirable to locate the regulator box below the table 10 and in such event the plungers 18 and 20 will be reversed so that the plunger 20 would be engaged from the top instead of from the bottom as above described. Also in practice it may be advantageous to have the length of plunger 20 adjustable. Such changes obviously fall within the purview of this invention.

Thus it will now be seen that by this improved regulating device it is now possible efficiently to operate molding machines and that the regulator device above described achieves all of the desirable objects heretofore recited.

What is claimed is:

1. A jar regulator for an air operated molding machine having a jarring table, said regulator comprising a box, a valve in the air line to the molding machine, said valve having a stem slidably carried in the box, spring means normally holding the valve shut, a handle overcoming the spring pressure to open the valve to cause operation of the jarring table, a detent lock to maintain the valve stem and valve in open position, regulator mechanism in the box, comprising an indexing ratchet wheel mechanism, a pivoted ratchet arm to operate the wheel, means to operate the arm from the table, said ratchet arm including a pawl to move the wheel step by step, a spring motor storing energy under movement of said wheel, a brake means for the wheel, a trip adapted to be manually set to predetermine the number of steps to be imparted to the wheel, said trip moving with the wheel and at the end of its travel engageable with the detent lock to release the same from the valve stem to cause the valve to close under the action of its spring pressure to stop operation of the molding machine, the spring motor simultaneously returning the ratchet wheel to its starting position, and means to move the brake means and ratchet pawl to inoperative position when the detent lock has been tripped.

2. A jar regulator for an air operated molding machine having a jarring table, said regulator comprising a box, a valve in the air line to the molding machine, said valve having a stem slidably carried in the box, spring means normally holding the valve shut, a handle overcoming the spring pressure to open the valve to cause operation of the jarring table, a detent lock to maintain the valve stem and valve in open position, regulator mechanism in the box, comprising a ratchet wheel, a ratchet arm pivoted adjacent the ratchet wheel, a pawl for the ratchet wheel slidably carried on the ratchet arm, means to operate the arm with its pawl from a movable element of the molding machine to turn the ratchet wheel step by step, a spring motor storing energy under movement of said wheel, a brake wheel adjacent to and movable with the ratchet wheel, a block fixed on the valve stem, a brake lock member carried in the block to engage the brake wheel to prevent back lash of the ratchet wheel, an indicator stop arm fixed in a selected position to determine the angular travel of the ratchet wheel, a trip lug on the brake wheel engageable with the detent lock to release the valve stem at the end of the travel of the ratchet wheel, the freed valve stem closing the valve and the spring motor returning the wheels to their initial positions, said trip lug stopping against the indicator stop arm, the brake lock member and ratchet pawl being released from their engaging positions upon movement of the freed valve stem.

3. The combination of a self-contained jar regulator with an air operated molding machine having a jarring table, air line pipe, and means for operating the table, in which said regulator comprises a box directly connected to and carried by the air pipe to the molding machine, a valve in the pipe, said valve having a stem slidably carried in the box, spring means normally holding the valve shut, manual means to overcome the spring pressure to open the valve and cause passage of air to operate the jarring table, a detent lock in the box engageable with the stem to hold it locked with the valve in open position, regulator mechanism in the box adjacent the stem, means to actuate said mechanism from the moving table, and a trip controlled by the regulator mechanism after the table has jarred a predetermined number of times to engage and release the detent lock, thereby causing the stem to be moved to close the valve and stop the molding machine.

4. The combination of a jar regulator with a molding machine having an air line, motor means operated by the air, and a reciprocating jarring table operated by said means, said regulator comprising a box closely associated with the air line, a valve in said air line, said valve being controlled by a stem means slidably carried in the box, spring means normally holding the valve closed, a handle for overcoming the spring pressure to open the valve to cause operation of the motor means and jarring table, a detent lock in the box to maintain the valve stem and valve in open position, a regulator mechanism in the box adjacent the stem means, means to actuate said regulator mechanism from the table, and means controlled by the regulator mechanism after the table has jarred a predetermined number of times to release the detent lock, thereby allowing the valve to move to closed position for stopping the molding machine.

5. The combination of a jar regulator with a molding machine having an air line, motor means operated by the air, and a reciprocating jarring table operated by said means, said regulator comprising a box closely associated with the air line, a valve in the air line, said valve being controlled by a stem means slidably carried in the box, spring means normally holding the valve closed, a handle for overcoming the spring pressure to open the valve to cause operation of the jarring table, a detent lock in the box to maintain the valve stem means and valve in open position, a regulator mechanism in the box adjacent the stem means, said regulator mechanism comprising an indexing ratchet wheel, a ratchet arm to operate the wheel, means to operate the ratchet arm from the table, said ratchet arm including a pawl to move the wheel step by step, a clock spring storing energy under movement of said wheel, a trip movable under influence of said wheel, said trip after a predetermined number of steps disengaging the detent lock from the valve stem means causing the valve to close under its spring pressure to stop operation of the molding machine and the clock spring simultaneously returning the ratchet wheel to its starting position.

6. The combination of a jar regulator with a molding machine having an air line, motor means operated by the air, and a reciprocating jarring table operated by said means, said regulator being proximately located to said air line and including a stem and a valve for the air, means manually to set the stem to open the valve to cause operation of the table, a detent lock to hold the stem with its valve open, a ratchet wheel adjacent the stem, a member operable by the table including a pawl to turn the wheel in a step by step manner, means to predetermine the number of steps to be imparted to the wheel, trip mechanism operable to engage the detent lock to release the valve stem when the predetermined number of steps have been imparted to the wheel, means to return the valve stem to close the valve and stop operation of the table, and means to return the wheel to the initial starting position.

7. The combination of a jar regulator with a molding machine having an air line, motor means operated by the air, and a reciprocating jarring table operated by said means, said regulator being proximately located to said air line and including a stem and a valve for the air, means manually to set the stem to open the valve to cause operation of the table, a detent lock to hold the stem with its valve open, a ratchet wheel adjacent the stem, a member operable by the table including a pawl to turn the wheel in a step by step manner, means to prevent back lash of the ratchet wheel, an indicator stop arm adapted to be manually set to predetermine the number of steps to be imparted to the ratchet wheel, a lug movable with the wheel adapted to engage and release the detent lock to free the valve stem when the ratchet wheel has moved the predetermined number of steps, means to move the valve stem after it has been freed to close the valve and stop operation of the table, and means to return the ratchet wheel to its initial starting position, said lug also being returned to stop against the indicator stop arm.

8. The combination of a jar regulator with a molding machine having an air line, motor means operated by the air, and a reciprocating member operated by said means, said regulator comprising a body connected with the air line, said body carrying regulator mechanism operable by the reciprocating member for controlling the number of blows imparted by the molding machine, a stem slidably carried in the body, a valve at one end of the stem and arranged in the air line, said stem and valve being manually slidable to open the valve, means in the body to engage the stem for locking the valve in open position, and automatically acting means to release the locking means and cause reverse sliding movement of the stem and valve to close the latter and stop operation of the molding machine after a predetermined number of blows.

9. The combination of a jar regulator with a molding machine having an air line, motor means operated by the air, and a reciprocating member operated by said means, said regulator comprising a body connected with the air line and carrying regulator mechanism including a slidable element in the body actuated by the reciprocating member, said regulator serving to control the number of blows imparted by the molding machine, a stem means slidably carried in the body, a valve at one end of and controlled by the stem means, said valve being arranged in the air line, said stem means and valve being manually slidable to open the valve to initiate operation of the molding machine, and automatically acting means to cause reverse sliding movement of the stem means and valve to close the latter and stop operation of the molding machine after a predetermined number of blows.

10. The combination of a jar regulator with a molding machine having an air line, motor means operated by the air, and a reciprocating member operated by said means, said regulator comprising a body connected with the air line and carrying regulator mechanism operable by the reciprocating member for controlling the number of blows imparted by the molding machine, a stem means slidably carried in the body, a valve at one end of and controlled by the stem means, said valve being arranged in the air line, means to slide the stem means to move the valve to open position, automatically acting means on the body to lock the stem means and valve in its open position, and means carried by the body to release the lock mechanism and permit automatic reverse sliding movement of the stem means to close the valve and stop operation of the molding machine after it has delivered a predetermined number of blows.

11. The combination of a jar regulator with a molding machine having an air line, motor means operated by the air, and a reicprocating member operated by said means, said regulator comprising a body carrying rotary regulating mechanism, a slidable element in the body operated by the reciprocating member to turn the rotary regulating mechanism, a stem slidably carried in the body, a valve at one end of the stem arranged in the air line, means to slide the stem to move the valve to open position to initiate operation of the molding machine, means on the body to lock the stem and valve in such open position, and means acting when the rotary means has reached a predetermined angular position to release the stem lock and to permit return of the stem and valve to closed position, thereby stopping operation of the molding machine after it has delivered a predetermined number of blows.

12. The combination of a jar regulator with a molding machine having an air line, motor means operated by the air, and a reciprocating member operated by said means, said regulator comprising a body connected with the air line and carrying a rotary toothed regulating wheel, a slidably mounted element in the body having connections to turn the toothed wheel, said element being operated by said reciprocating member, a valve operating stem means slidably mounted in the body and air line, means to slide the stem means to move the valve to open position, means to lock the stem means in open position, means to index the wheel step by step, means to prevent overrun of the wheel in its movement, and means on the wheel to disengage the stem lock and permit return of the stem means and valve to closed position when the wheel has moved a predetermined angular distance to stop the molding machine when it has delivered the desired number of blows.

RUSSELL J. ANDERSON.